Patented June 21, 1938

2,121,326

UNITED STATES PATENT OFFICE 2,121,326

POUR POINT REDUCER

Ernest F. Pevere, Beacon, N. Y., assignor to The Texas Company, New York, N. Y., a corporation of Delaware No Drawing. Application November 17, 1933, Serial No. 698,495

9 Claims. (Cl. 87—9)

This invention relates to the manufacture of lubricating oil characterized by a low pour test, and to novel wax crystal inhibitors and to methods of producing the same.

The invention contemplates the preparation of mineral lubricating oil having a reduced pour test and other desired qualities from lubricating oil stock, such as those derived from mixed base and paraffin base crudes and the like, by the addition to the lubricating oil of a pour-depressing material or wax crystal inhibitor. The invention particularly contemplates the addition to a lubricating oil of tarry residuum products from high temperature vacuum distillation of a condensation product of an aromatic hydrocarbon in the presence of a Friedel-Craft's catalyst, such as aluminum chloride.

Lubricating oil stocks derived from paraffin and mixed base crudes contain appreciable amounts of wax and, therefore, have a relatively high pour test unless a substantial amount of this wax is removed. The removal of this wax is usually accomplished by cold settling, filtration or centrifuging. However, lubricating oil stock, after dewaxing by these processes, may still retain some wax, and may have a pour test well above 0° F., for example, about 25° F. The removal of further quantities of wax from these stocks in order to further reduce the pour test necessitates expensive further processing.

On the other hand, the presence of a certain amount of wax in a lubricating oil may be beneficial from the standpoint of providing a comparatively flat temperature-viscosity curve. That is, there is a relatively small change in the viscosity of the oil between temperatures of say 100° F. and 210° F. Consequently, it is of advantage to add to the oil a material which will have the effect of reducing the pour test or cold test to the desired extent without the necessity of entirely removing the remaining wax.

The condensation of naphthalene in the presence of aluminum chloride produces a number of higher polymers which may be separated by fractional distillation. Included in these polymers is a red viscous oil possessing a green fluorescence, boiling about 300° C. at an absolute pressure of 10 mm. of mercury, having the formula $C_{26}H_{22}$, and which is variously termed tetra-methylpicene, di-methyl-crackene or a naphthanthracene derivative. This red colored hydrocarbon $C_{26}H_{22}$ has been added to mineral lubricating oil which is deficient in the characteristic green bloom of Pennsylvania lubricating oils to impart to such oil a red color by transmitted light and a characteristic green color by reflected light.

I have discovered that if the lower boiling polymers produced in the condensation of an aromatic hydrocarbon, such as naphthalene, in the presence of aluminum chloride, are removed by vacuum distillation, there will remain a residue non-volatile at a temperature of 310° C. at an absolute pressure of 10 mm. of mercury, which is unusually effective in lowering the pour point of mineral lubricating oils. In addition, this tarry residue also imparts a desired green fluorescence to oils which are lacking in this characteristic. I have further discovered that by mixing the aromatic hydrocarbon and the aluminum chloride in certain proportions, and carrying out the condensation reaction at high temperatures for a substantial period of time, the condensation reaction can thereby be controlled so as to produce a proportionately greater quantity of the desired high boiling polymers which remain in the residue, and a correspondingly lesser proportion of the lower boiling polymers which have little effect upon the pour point and which are distilled off in the preparation of the present wax crystal inhibitor.

Various aromatic hydrocarbons which condense in the presence of a metallic halide catalyst, such as aluminum chloride, can be employed. For example, hydrocarbons of the naphthalene, anthracene, phenanthrene and fluorene groups operate very satisfactorily. Likewise, aromatic hydrocarbons such as benzene, toluene, and homologues thereof, which first form condensed nuclei of one or more of the above groups in the presence of aluminum chloride, and then further condense to high boiling hydrocarbon polymers, can be employed. While I prefer to use an aromatic hydrocarbon such as naphthalene, anthracene, phenanthrene or fluorene, because of its ready availability and cheapness, various homologues and alkylated derivatives thereof function satisfactorily in accordance with the present invention. The particular aromatic hydrocarbon selected is condensed in such a manner as to produce a large proportion of high boiling polymers which remain in the tarry residue resulting from high vacuum distillation of the condensation product at temperatures up to about 310° C. The residue so produced is found to be a highly effective pour point reducer for a mineral lubricating oil. For purposes of description, the condensation of naphthalene is specifically set forth in the following text; but it is to be understood that other aromatic hydrocarbons of the character set forth above can be employed in place of naphthalene.

In the preparation of the pour point depressant of this invention, naphthalene preferably dissolved in a solvent such as kerosene, is mixed with anhydrous aluminum chloride, and the mixture heated at elevated temperatures for a substantial length of time in a reaction vessel provided with a reflux condenser. Water is then added to decompose the aluminum chloride-hydrocarbon complex and to thereby precipitate the catalyst. A solvent, such as benzene, is preferably added to insure solution of the reaction product. The catalyst is then filtered off, and the benzene solution is distilled under high vacuum. The kerosene, benzene and unreacted naphthalene distil off at temperatures below 200° C. at 10 mm. mercury. A cut distilling between 200°–225° C./10 mm. is obtained, which is a light colored liquid containing substantial quantities of tetra-methyl naphthalene. This material does not affect the pour point of a lubricating oil. A second cut distilling between 225°–300° C./10 mm. contains substantial quantities of beta-beta-dinaphthyl, which also is found quite ineffective in lowering the pour point. At approximately 300°–310° C./10 mm., a red oily material having the formula $C_{26}H_{22}$, and corresponding to the hydrocarbon polymer referred to above, is obtained in the distillate. This material has only a slight effect on the pour point, and does not represent a commercially satisfactory pour point depressant.

The residue from the above-mentioned distillation is a black tarry substance substantially completely soluble in benzene and xylene, to which it imparts a green cast. This residue contains the active pour reducing compound or compounds. The percentage yield of the residue depends upon the proportion of aluminum chloride used, and the time and temperature of the reaction. To illustrate, a condensation product prepared from four parts of naphthalene to one part of aluminum chloride, reacted at a temperature of 30° F. for twenty-four hours, gave a yield of only about 1.5% by weight of the desired tarry residue, on the weight of the naphthalene employed. On the other hand, using the same proportions of ingredients, but with a reaction temperature of 95° C. maintained for four hours, a yield of 60.6% tarry residue was obtained. Again, using equal parts of naphthalene and aluminum chloride, and allowing the reaction to continue over a period of twenty-four hours at 100° C., gave a yield of 72.8% of tarry residue on the weight of the naphthalene.

In general, it may be stated that increasing the proportion of the aluminum chloride up to and somewhat above equal proportions, gives an increased yield of the desired residue; likewise increasing the time and temperature of the reaction up to about twenty-four hours and around 100° C. respectively, gives increased yields of the wax crystal inhibitor. It is preferred to carry out the reaction with the use of approximately equal proportions of the ingredients, and at a temperature above 90° C. for a period of time in excess of six hours. Not only is the yield of the residue increased by control of the proportions of the ingredients and the time and temperature of the reaction, as set out above, but also the activity of the resultant residue is enhanced. For example, the addition to 100 cc. of pale lubricating oil having a pour point of 25° F. of 0.25 g. of a residue produced by reacting five parts of naphthalene with one part of aluminum chloride at a temperature of 100° C. for four hours, gave a resultant oil having a pour point averaging +5° F. On the other hand, the addition to 100 cc. of the same oil of 0.25 g. of a residue, produced by the optimum conditions mentioned above which gave a yield of 72.8%, lowered the pour point from +25° F. to −5° F.

When using a different aromatic hydrocarbon starting material, for example, anthracene, phenanthrene, fluorene, etc., the operation is essentially the same. The proportions of the reacting ingredients, and the time and temperature of contact, are regulated as set out above to produce a condensation product containing a high yield of high boiling hydrocarbon polymers. The condensation product, after separation of the catalyst and purification, is distilled under an absolute pressure of about 10 mm. Hg to a residue which is non-volatile at temperatures of 300°–310° C. This residue contains the active pour point reducing material. For example, 0.25 g. of the condensation residue remaining after vacuum distillation at 10 mm. to 300° C., resulting from the condensation of anthracene in the presence of aluminum chloride as above described, when added to 100 cc. of the same lubricating oil mentioned above having a normal pour point of 25° F., lowered the pour point to −15° F. The same amounts of condensation residues produced in the same manner from phenanthrene and fluorene, when added to the same oil, lowered the pour point to 0° F. and −5° F. respectively.

The tarry residue produced as outlined above may be added directly to a lubricating stock; or an extract of the residue may be first prepared and this extract added to the lubricating stock. Thus, a small proportion of the mineral oil to be treated, or other lubricating oil, may be used to form a concentrate of the residue; and this concentrate can then be added in predetermined proportions to a large body of the oil to be treated. Again, different solvents may be employed to produce an extract of the tarry residue. Suitable solvents include benzene, xylene, toluene, various aliphatic monohydric alcohols, such as methyl, ethyl, propyl, butyl, the various amyl alcohols, and the like. While all such extracts give highly satisfactory results, it is found that certain solvents have a selective action on the residue, by dissolving in more concentrated form the particular pour depressant compound or compounds present in the residue. Thus, it is found that the higher alcohols of the aliphatic monohydric series, give superior results to those of the lower alcohols. For example, 0.25 g. of the residue, extracted with isoamyl alcohol, added to 100 cc. of the particular pale lubricating oil specified above, lowers the pour point from +25° F. to −20° F.

A further concentrated form of the pour depressant material may be prepared from the tarry residue, by dissolving this residue in a solvent such as benzene, and then diluting the solution with a light petroleum distillate, such as a light naphtha, when a brownish precipitate is thrown out of the solution and can be recovered by filtration. This material analyzes to the formula of tetra-naphthyl, $C_{40}H_{2n}$. In dry powdery form, it may be added directly to the lubricating oil; or the tetra-naphthyl may be dissolved in a small proportion of solvent, such as benzene, to form a concentrate which can be added in liquid form in suitable proportions to the mineral oil.

In either case, a highly effective pour depressant is obtained. For example, 0.2 g. of this material added to 100 cc. of the mentioned pale oil, lowers the pour point from +25° F. to −5° F.

All of the materials mentioned above, including the tarry residue, extracts thereof, and the separated tetranaphthyl, also have the property of imparting to such oil a red color by transmitted light and a green color by reflected light, which closely approximate the corresponding colors of a Pennsylvania oil.

While the invention has been described particularly with the employment of aluminum chloride as a condensing agent, it is to be understood that other metallic halide catalysts of the Friedel-Craft's type, such, for example, as halides of zinc, iron, antimony, cadmium, boron, manganese, nickel, tin and the like, can be used. The proportions in which the wax crystal inhibitor is added to the mineral lubricating oil can be varied widely. However, it is usually desirable to add only that proportion which will lower the pour point to the required low temperature. Generally, a fraction of 1% of the pour depressant material, such as ½% or less, is sufficient.

While it is usually desirable to distil off the lower boiling polymers, which have little or no effect on the pour point, to obtain a residue of high concentration in pour depressing compound or compounds, it is not necessary to remove all of these lower boiling diluents, as long as the reaction is carried out in a manner to obtain a high yield of the desired residue of the order of 40% or more by weight on the weight of the aromatic hydrocarbon employed. In such case, the corresponding yields of the lower boiling polymers, such as the red oil and the beta-beta-dinaphthyl, are comparatively small; and by distilling off compounds boiling below substantially 225° C. to 300° C./10 mm., a residuum is obtained which consists essentially of the residue boiling above 310° C./10 mm., and which is as effective, or more effective, than other pour point depressants now on the market. By concentrating the depressant of this invention in the manner described, a material is obtained which is from five to eight times more effective than the leading depressant now on the market.

Where the expression "paraffin base lubricating oil" is used in the description and claims, it is to be understood that this means an oil of the mixed base or Mid-Continent type as well as an oil of the paraffin base or Pennsylvania type, unless the contrary appears from the text.

Obviously many modifications and variations of the invention, as hereinbefore set forth, may be made without departing from the spirit and scope thereof, and therefore only such limitations should be imposed as are indicated in the appended claims.

I claim:

1. A lubricating oil of improved character comprising a blend of a petroleum lubricating oil with a minor proportion of a material consisting essentially of the residue boiling above 310° C. at an absolute pressure of 10 mm. mercury of a condensation product consisting solely of an aromatic hydrocarbon unmixed with a reactive aliphatic organic compound in the presence of a metallic halide condensation catalyst.

2. A lubricating oil of low pour point comprising a blend of a petroleum lubricating oil with a minor proportion of a wax crystal inhibitor consisting essentially of a hydrocarbon polymer having the chemical formula of tetra-naphthyl $C_{40}H_{32}$.

3. A lubricating oil comprising a blend of a petroleum lubricating oil with a minor proportion of the residuum consisting essentially of residue boiling above 310° C. at an absolute pressure of 10 mm. mercury resulting from the vacuum distillation of a condensation product of naphthalene unmixed with a reactive aliphatic organic compound in the presence of a metallic halide condensation catalyst.

4. A lubricating oil comprising a blend of a petroleum lubricating oil with a minor proportion of a residuum consisting essentially of residue boiling above 310° C. at an absolute pressure of 10 mm. mercury resulting from the vacuum distillation of a condensation product of anthracene unmixed with a reactive aliphatic organic compound in the presence of a metallic halide condensation catalyst.

5. A lubricating oil comprising a blend of a petroleum lubricating oil with a minor proportion of a residuum consisting essentially of residue boiling above 310° C. at an absolute pressure of 10 mm. mercury resulting from the vacuum distillation of a condensation product of phenanthrene unmixed with a reactive aliphatic organic compound in the presence of a metallic halide condensation catalyst.

6. A lubricating oil having a pour point below 0° F. comprising a partially dewaxed paraffin base mineral lubricating oil normally having a pour point substantially above 0° F., admixed with a minor proportion of a wax crystal inhibitor consisting essentially of residue boiling above 310° C. at an absolute pressure of 10 mm. mercury of a condensation product solely of an aromatic hydrocarbon unmixed with a reactive aliphatic organic compound in the presence of a metallic halide condensation catalyst.

7. A lubricating oil having a pour point below 0° F. comprising a partially dewaxed paraffin base mineral lubricating oil normally having a pour point substantially above 0° F., admixed with a minor proportion of a wax crystal inhibitor consisting essentially of residue boiling above 310° C. at an absolute pressure of 10 mm. mercury of a condensation product solely of an aromatic polynuclear hydrocarbon unmixed with a reactive aliphatic organic compound in the presence of a metallic halide condensation catalyst.

8. A lubricating oil having a pour point below 0° F. comprising a partially dewaxed paraffin base mineral lubricating oil normally having a pour point substantially above 0° F., admixed with a minor proportion of a wax crystal inhibitor consisting essentially of residue boiling above 310° C. at an absolute pressure of 10 mm. mercury of a condensation product solely of naphthalene unmixed with a reactive aliphatic organic compound in the presence of a metallic halide condensation catalyst.

9. A lubricating oil of improved character comprising a blend of a petroleum lubricating oil with less than 1% by weight of residue boiling above 310° C. at an absolute pressure of 10 mm. mercury of a condensation product solely of an aromatic polynuclear hydrocarbon unmixed with a reactive aliphatic organic compound in the presence of a metallic halide condensation catalyst.

ERNEST F. PEVERE.